Oct. 13, 1942.   J. L. RAY   2,298,309
LOCOMOTIVE
Filed Feb. 19, 1940   5 Sheets-Sheet 1
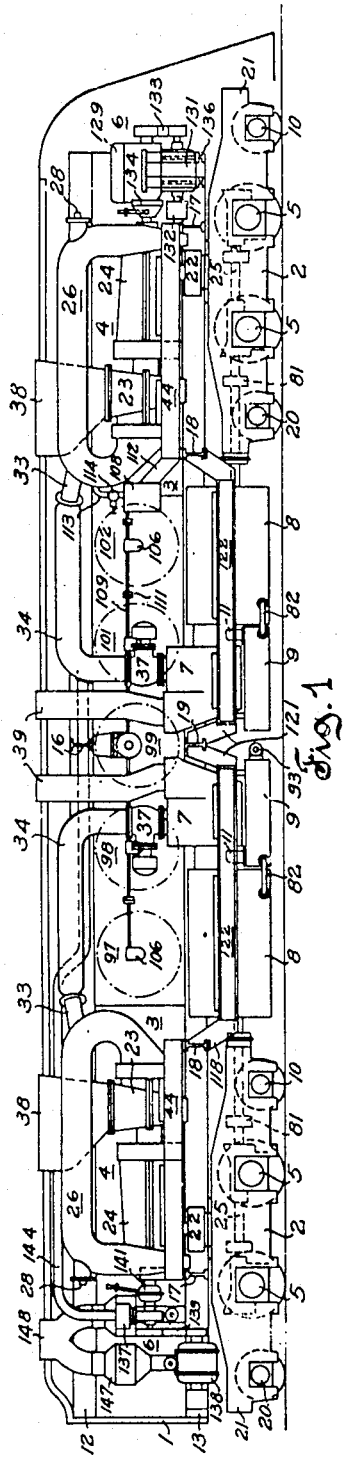
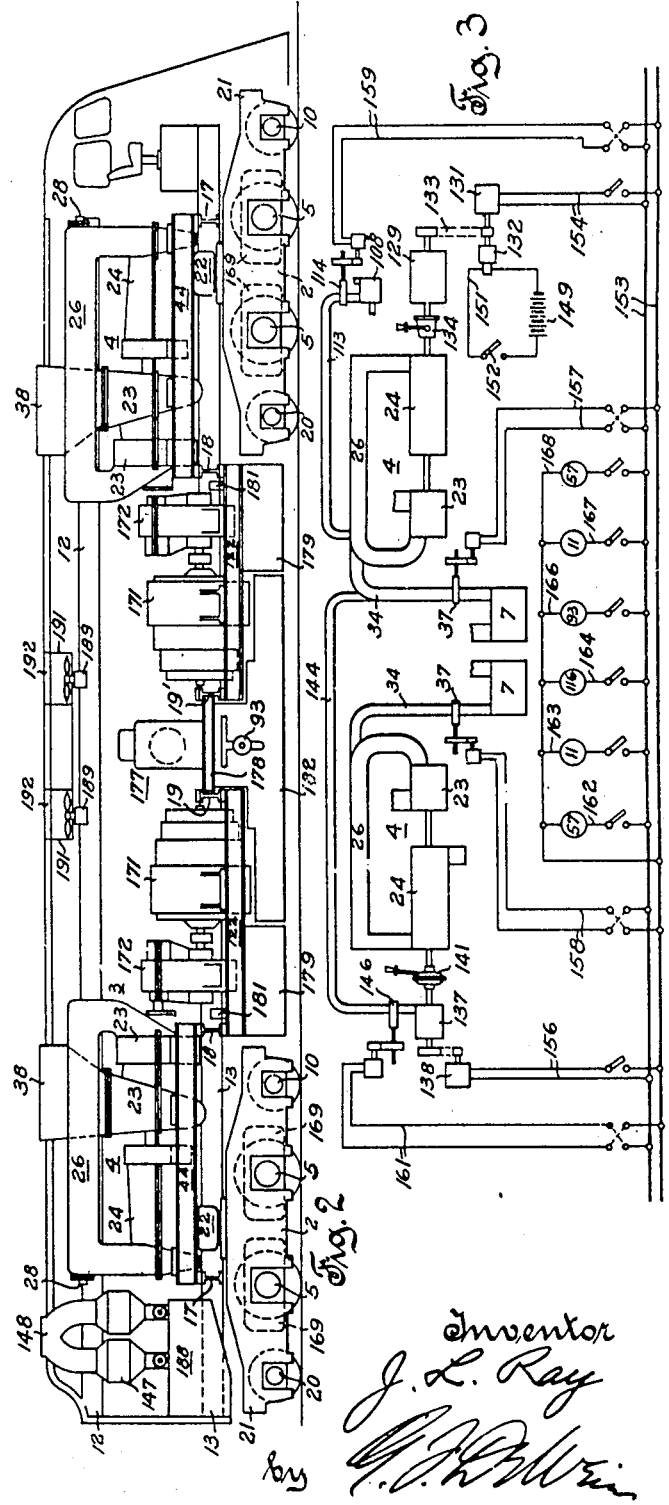

Oct. 13, 1942.                J. L. RAY                2,298,309
                             LOCOMOTIVE
                       Filed Feb. 19, 1940           5 Sheets-Sheet 2

Inventor
J. L. Ray
by
Attorney

Oct. 13, 1942.  J. L. RAY  2,298,309

LOCOMOTIVE

Filed Feb. 19, 1940  5 Sheets-Sheet 3

Inventor
J. L. Ray
by
Attorney

Oct. 13, 1942.                    J. L. RAY                    2,298,309
                                 LOCOMOTIVE
                           Filed Feb. 19, 1940              5 Sheets—Sheet 5

Inventor
J. L. Ray
by
Attorney

Patented Oct. 13, 1942

2,298,309

UNITED STATES PATENT OFFICE 2,298,309

LOCOMOTIVE

James L. Ray, Elm Grove, Wis., assignor to Allis-Chalmers Manufacturing Company, Milwaukee, Wis., a corporation of Delaware Application February 19, 1940, Serial No. 319,581

22 Claims. (Cl. 105—35)

This invention relates generally to locomotives and more particularly to a locomotive construction permitting continuous high speed operation for long distances.

Recent demands for high speed transportation for long distances, particularly with respect to passenger service, have stimulated efforts to develop a high speed locomotive for this type of service which would be satisfactory with respect to initial cost, smoothness of operation, speed-torque characteristics, continuity of service, maintenance costs and efficiency. However, the known types of locomotives, as improved by the developments which have been perfected to date, have not proved satisfactory in all of the respects noted above. For example, the efficiency of the modern reciprocating steam engine locomotive is only of the order of 3–9%, and the construction of this type of engine for high speed operation nearly doubles the initial cost. Moreover, the unbalanced reciprocating parts produce an uneven transmission of power and excessive vibration which are characteristic and undesirable features. The high initial and maintenance costs of Diesel electric locomotives increases the cost of operating trains drawn thereby to a value materially in excess of the cost of operating a similar train drawn by a reciprocating steam engine type of locomotive. The steam turbine electric locomotive, when constructed so as to be satisfactory with respect to initial cost, speed-torque characteristics and efficiency has proven impractical because of the unreliable service afforded and because of the extremely high maintenance costs.

In accordance with this invention the aforementioned undesirable features of the reciprocating steam engine, Diesel electric and steam turbine electric types of locomotives can be eliminated by a locomotive construction embodying a continuous combustion gas turbine power plant and either a hydromechanical or an electrical power transmitting mechanism coupling the turbine with the axles driven thereby. The coupling efficiency of a continuous combustion gas turbine system is of the order of 17–20%, and with a suitable hydromechanical transmission the driving axle efficiency is of the order of 14–16%. The coupling efficiency of the continuous gas turbine system is considerably less than that of a Diesel engine system, but the difference between the fuel consumptions of these two systems is in many cases fully offset by the difference in the price of the Diesel oil and the Bunker "C" oil used in the turbine system. Moreover, the gas turbine system affords a decided advantage over the Diesel engine with respect to maintenance costs as it is practically impossible to lubricate the high speed Diesel engines suitable for locomotive service so as to eliminate the frequent overhauling which is necessary in order to replace the stuck rings and the excessively worn parts.

The continuous combustion gas turbine, which is simple to construct and which affords reliable service. operates to directly produce rotary motion thereby eliminating the aforesaid uneven operation and vibration characterizing the reciprocating steam engine. In addition, the gas turbine system eliminates the high pressure steam generator, the large water storage space, the condensing system and the additional auxiliary apparatus essential for the efficient operation of a steam turbine and the necessity for crowding the said essential apparatus into the limited space available which largely contributes to frequent interruptions in service and high maintenance costs.

Therefore, the primary object of this invention is to provide an improved locomotive construction.

Another object of this invention is to provide an improved locomotive construction in which the power generating means, the transmission mechanism, etc. are correlated in a novel manner to produce a low center of gravity.

Still another object of this invention is to provide an improved locomotive construction embodying a novel supporting arrangement for the power generating means and for the transmission mechanism.

Still another object of this invention is to provide an improved locomotive construction embodying a novel transmission oil cooling arrangement.

Still another object of this invention is to provide an improved continuous combustion gas turbine driven locomotive in which essential elements or features of construction and groups of such elements or features are correlated in a novel manner.

A further object of this invention is to provide an improved continuous combustion gas turbine driven locomotive in which a plurality of driving turbines and a plurality of power transmission means are correlated in a novel manner.

The invention accordingly consists of the various features of construction, combinations of elements and arrangements of parts as more fully pointed out in the appended claims and in the detailed description, in which:

Fig. 1 is a diagrammatic side elevation of a locomotive embodying the invention with the near side wall and main member removed to better show the arrangement of parts;

Fig. 2 is a view similar to that of Fig. 1 illustrating a modified arrangement;

Fig. 3 is a schematic illustration of a simplified control system for the arrangement shown in Fig. 1;

Figure 4:
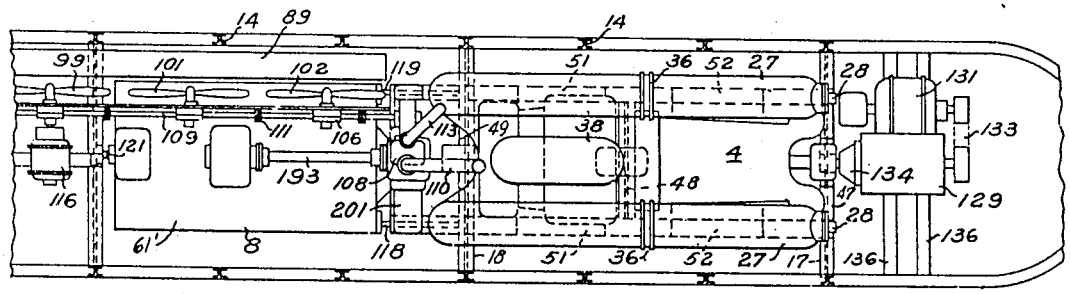
Fig. 4 is a diagrammatic plan view of the forward portion of a locomotive with the roof removed illustrating another modification.
Figure 5:
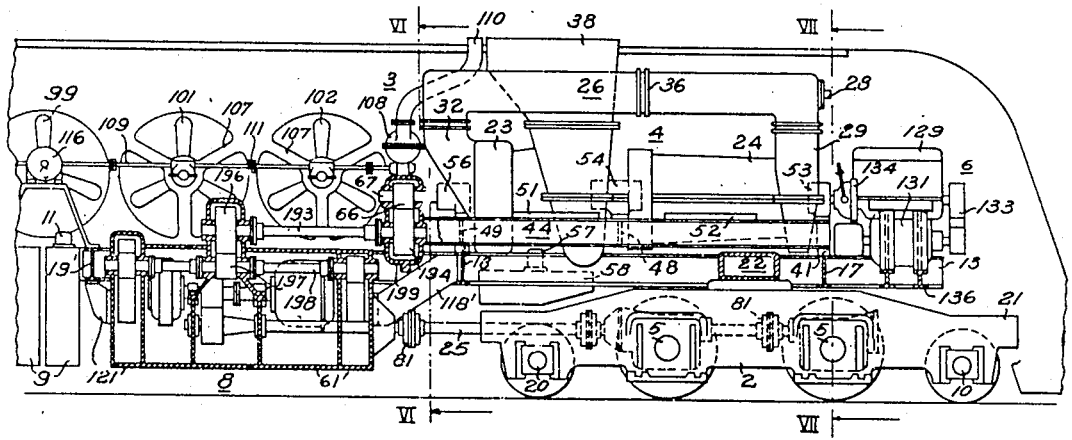
Fig. 5 is a side elevation of the arrangement shown in Fig. 4 with the near side wall and main frame member removed.

Referring to Fig. 1, it is seen that the locomotive comprises a main frame 1 supported at each end by a bogie 2 and two power plants 3 each including a continuous combustion gas turbine system 4, a prime mover generator unit 6 for starting the turbine system 4, a power turbine 7, a hydromechanical transmission 8, a transmission fluid reservoir and circulating pump 9 and 11, respectively, for supplying the working fluid to the hydraulic power transmitting elements of the transmission 8.

The main frame as best seen in Figs. 1 and 13–15, inclusive, comprises two pairs of vertically spaced upper and lower longitudinally and parallelly extending hollow side members 12 and 13, respectively, a plurality of longitudinally spaced and vertically extending spacing and reinforcing members 14 connecting each pair of side members 12 and 13, a plurality of longitudinally spaced and laterally extending upper spacing and reinforcing members 16, of which only one is shown, connecting the upper side members of the said pairs, and a plurality of similarly arranged longitudinally spaced and laterally extending lower spacing and reinforcing members 17, 18 and 19 connecting the lower side members 13 of said pairs. The main frame is supported on each bogie frame 21 by means of the usual king pin and socket connection 22 so as to provide relative pivotal movement between the bogie and main frame. Each bogie 2 includes two driving axles 5 interposed between a pilot wheel axle 10 and a trailing wheel axle 20. The driving axles 5 on each bogie are connected with the adjacent power turbine 7 by means of the drive shafts 25 and the hydromechanical transmission 8 as clearly shown in Figs. 8–10, inclusive.

Figure 12:
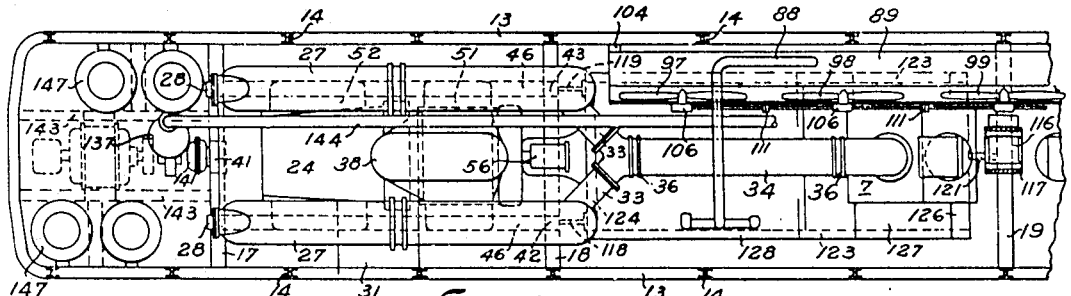
Fig. 12 is a plan view of the portion of the locomotive shown in Fig. 11 with the roof removed.
Figure 11:
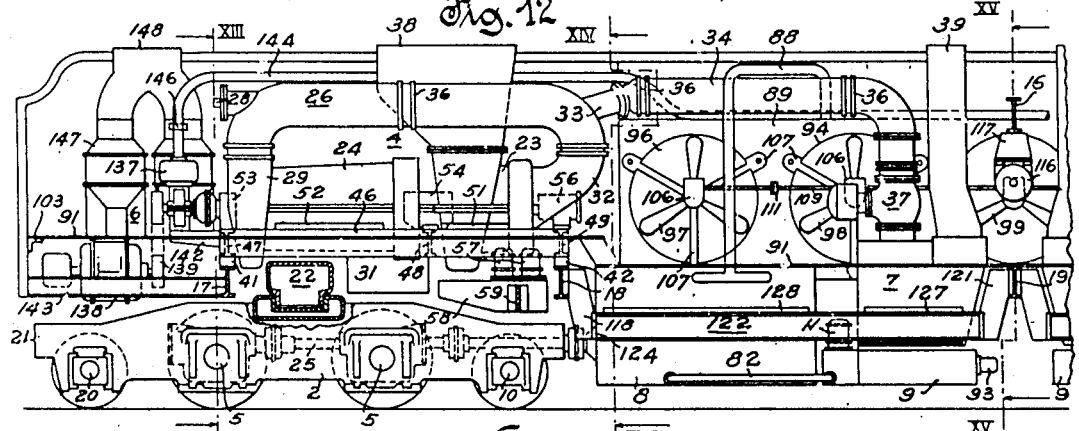
Fig. 11 is an enlarged side elevation of the rear portion of the locomotive shown in Fig. 1.
Figures 13, 14, 15:
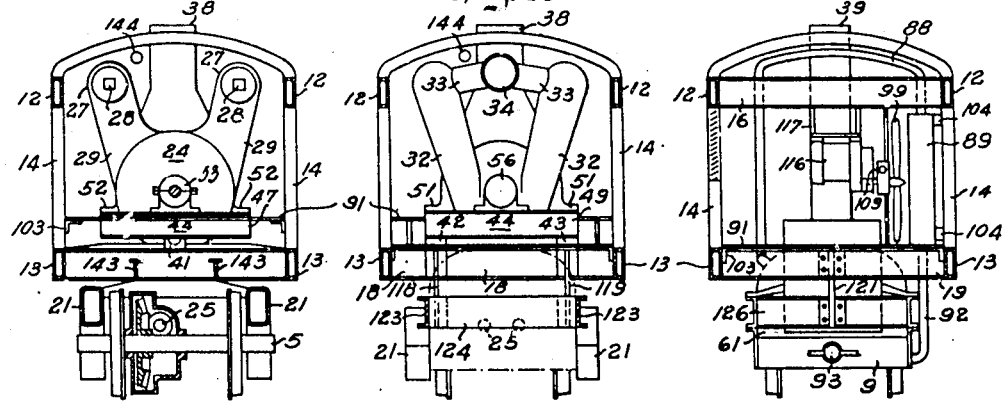
Fig. 13 is a sectional view taken on line XIII—XIII of Fig. 11.
Fig. 14 is a sectional view taken on line XIV—XIV of Fig. 11.
Fig. 15 is a sectional view taken on line XV—XV of Fig. 11.

Each continuous combustion gas turbine system 4 comprises a turbine 23, an axial compressor 24 disposed in axial alinement and operatively connected with the turbine 23, and a combustion chamber 26 which, as best shown in Figs. 12–14, inclusive, consists of a pair of elongated tubular members 27 extending in spaced and approximately parallel relation with respect to each other and with respect to the axis of the turbine and compressor. The compressor end of each tubular member 27 is provided with a regulatable oil burner 28 of known construction and is connected with the discharge end of the compressor 24 by a pipe 29. The pipes coact to form what is in effect a Y-discharge connection for the compressor as best shown in Fig. 13. The inlet end of the compressor 24 communicates with the atmosphere outside the locomotive by means of a laterally extending duct 31 as shown in Figs. 11 and 12. The opposite end of each tubular member 27 is connected with the admission end of the turbine 23 by a pipe 32 and with the admission end of the power turbine 7 by means of the pipes 33 and 34, as best shown in Figs. 12 and 14. The pipe 34 is provided with flexible portions or connections 36 and with a motor operated valve 37 for controlling the flow of the motive fluid to the power turbine 7. The turbine 23 exhausts through the roof of the locomotive by means of a radially extending exhaust conduit 38 which passes upward between the tubular members 27 as shown in Figs. 11–14, inclusive. The power turbine exhausts through a pipe 39 which also extends upward through the roof of the locomotive.

Each continuous combustion turbine system 4 is supported by an end portion of the main frame 1 in symmetrical relation with respect to the longitudinal axis of the locomotive and in superposed relation with respect to the underlying bogie 2 by means of three supporting members 41, 42 and 43 and a generally rectangular frame 44 comprising two parallel side members 46 and three longitudinally spaced transverse members 47, 48 and 49. The mid-portion of the transverse member 47 of the frame 44 is supported on the mid-portion of the transverse member 17 of the main frame 1 by the supporting member 41 and the transverse member 49 of the frame 44 is supported on the transverse member 18 of the main frame 1 at laterally spaced points which are symmetrically arranged with respect to the longitudinal axis of the locomotive by the two supporting members 42 and 43 as best seen in Figs.

12 and 14. The supporting member 41, which may include a cushioning member of resilient material, is constructed so as to permit relative pivotal movement between the rectangular frame 44 and the transverse main frame supporting member 17. The supporting members 42 and 43 are rigidly secured to the transverse main frame supporting member 17 so as to prevent relative lateral and longitudinal movements between the frame 44 and the transverse member 17. The turbine and compressor casings of each system 4, are supported on the two side members 46 of the frame 44 by means of laterally extending supporting portions 51 and 52, respectively, and each system is provided with three bearing structures 53, 54 and 56 which coact with the midportions of the three transverse members 47, 48 and 49, respectively, to rotatably support the axially alined turbine and compressor spindles. Movement of the turbine and compressor casings with respect to the supporting frame is prevented in the usual manner by the use of loose fitting bolts or an equivalent means not shown. The bearings for each continuous combustion turbine system and the associated power turbine are force lubricated by means including the pumps 57 and the oil reservoir 58 supported beneath the rectangular frame 44 by brackets 59 which are connected with the side members of the main frame 1. The lubricating pipe lines are omitted in the interests of simplicity. The structure just described provides a three point support for the entire continuous combustion turbine system 4 which permits a compact symmetrical arrangement of the coacting turbine, compressor and combustion chamber elements and which prevents subjecting said elements to the torsional movements of the main frame.

Figure 9:
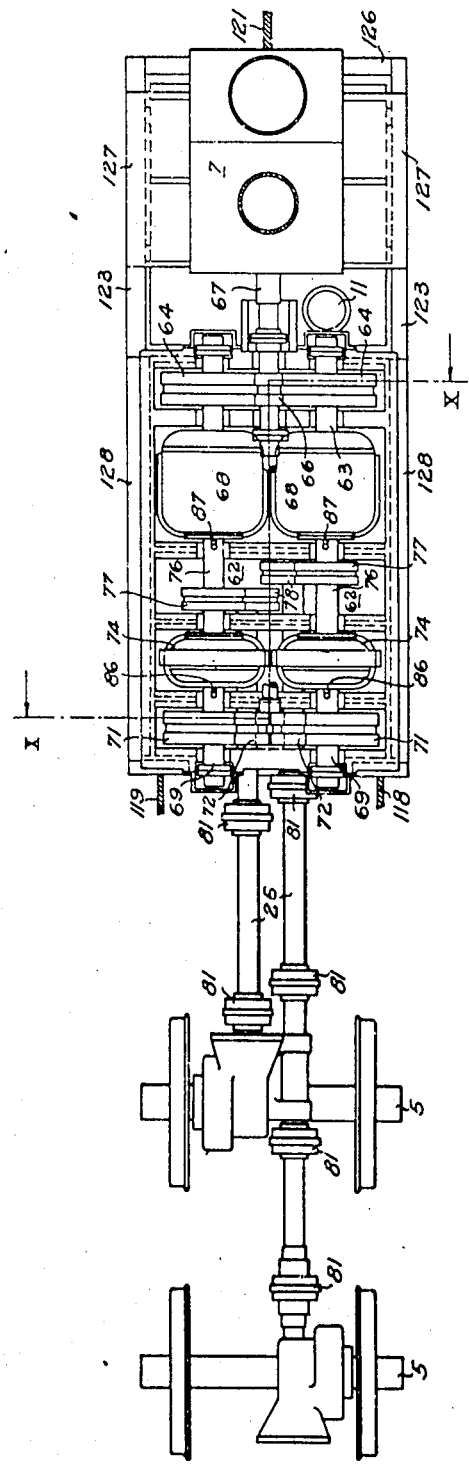
Fig. 9 is a plan view of the transmission mechanism shown in Fig. 8 with the cover removed to better show the arrangement of parts.
Figure 10:
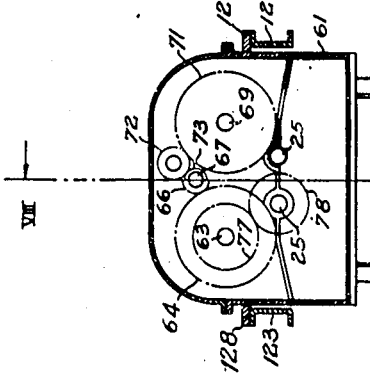
Fig. 10 is a sectional view taken on line X—X of Fig. 9.

The transmission 8 consists of an interiorly partitioned housing 61 rotatably supporting laterally spaced and parallelly extending groups of lay shafts 62 with each group including a first shaft 63 having secured thereon a pair of gears 64 which are constantly in mesh with a pair of pinions 66 on the turbine shaft 67 and the driving elements of a combined hydraulic torque converter and coupling unit 68 of known construction, a second shaft 69 having secured thereon a pair of gears 71 which are constantly in mesh with a pair of idler gears 72 which in turn are constantly in mesh with a second pair of pinions 73, as best shown in Fig. 10, on the turbine shaft 67 and the driving element of a torque converter unit 74, and a third shaft 76 having secured thereon the driven elements of the said combined unit 68 and the said converter unit 74 and a pair of gears 77 which are constantly in mesh with a pair of pinions 78 on the associated drive shaft 25. The arrangement is such that when it is desired to drive the locomotive in the ahead direction, the fluid is drained from the torque converter units 74 and fluid admitted to the selected driving elements of the combined units 68, whereupon power is transmitted from the turbine shaft 67 through the shafts 63, the combined units 68 and the shafts 76 to the drive shafts 25. When it is desired to drive the locomotive in the reverse direction, the fluid is drained from the combined units 68 and fluid admitted to the converter units 74, whereupon power is transmitted from the turbine shaft 67 through the idler gears 72, the shafts 69, converter units 74 and shafts 76 to the drive shafts 25. Valve arrangements for selectively filling and emptying a plurality of hydraulic coupling units are old in the art and the necessary valves and their arrangement has been omitted in order to simplify the disclosure. The drive shafts 25, which include the requisite number of flexible coupling units 81, are geared to the driving axles 6 in the usual manner, as best shown in Figs. 9 and 13.

Figure 8:
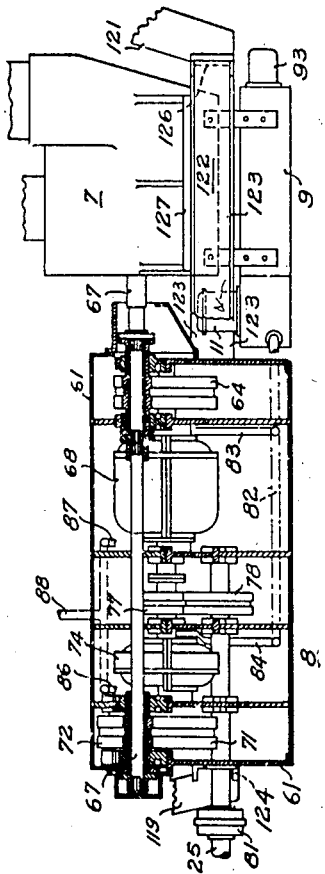
Fig. 8 is a vertical longitudinal section through the transmission mechanism associated with the rear power turbine of Fig. 1.

The transmission fluid for the combined converter and coupling units and for the converter units is withdrawn from the reservoir 9, which is removably secured to the bottom portion of the casing of the power turbine 7, as best shown in Fig. 8, by the motor driven pump 11 and delivered through the pipe 82 and the branch pipes 83 and 84 to the said units. The transmission fluid flows from the said units through the branch pipes 86 and 87 and the connecting pipe 88 to the top of the elongated heat exchanger 89 which is disposed in the space immediately above the floor plates 91 and between the longitudinally spaced continuous combustion turbine systems 4, downward through the said heat exchanger and then through the pipe 92 back to the reservoir 9. The pipes 82–88, inclusive, and the pipe 92 either should be constructed of flexible material or should include flexible couplings (not shown) to permit relative movement of the devices to which the said pipes are connected. The pump 11 and also a motor driven fuel transfer pump 93, which pump 93 operates to withdraw fuel from a tank (not shown) and to deliver liquid fuel under pressure to the burners 28, are both removably mounted on the reservoir 9 in the manner indicated in Figs. 11 and 15. The heat exchanger 89, which is of known construction, includes a core enclosed in a casing 94 which is provided with a plurality of transverse openings 96 through which air is forced in heat exchanging relation with the core by means of the fans 97, 98, 99, 101 and 102. The floor plates 91 are supported by means of suitable brackets 103 secured to the side wall framework of the locomotive, as best shown in Figs. 11 and 13.

The heat exchanger casing 94 is secured to the side wall framework of the locomotive by means of suitable brackets 104, as best shown in Figs. 12 and 15. The fans 97, 98, 101 and 102, which include a gear box 106, are supported on the side wall of the heat exchanger casing 94 by means of suitable brackets 107. These four fans are driven by an auxiliary gas turbine 108 by means of the longitudinally extending shaft 109 which is journaled in the gear boxes 106 and which includes a plurality of flexible couples 111. The auxiliary turbine 108, which is mounted on the supporting frame 44 for the continuous combustion turbine system 4 at the front end of the locomotive by the bracket means 112, receives motive fluid from the combustion chamber 26 of the adjacent continuous combustion turbine unit 4 by means of the pipe 113 which includes a motor operated valve 114. The fan 99 is driven by an electric motor 116 which is suspended from the upper transverse member 16 of the main frame by a bracket 117 as best shown in Figs. 11 and 15.

The transmission 8 and the power turbine 7, including the transmission fluid reservoir 9, are supported as a unit from the main frame 1 in symmetrical relation with respect to the longitudinal axis of the locomotive by means of three depending brackets 118, 119 and 121 and a rectangular frame 122 comprising two parallel side members 123 and two longitudinally spaced transverse members 124 and 126. The transverse member 124 is connected at laterally spaced points, which are symmetrically arranged with respect to the longitudinal axis of the locomotive, with similarly arranged points on the transverse member 18 of the main frame 1 by means of the two brackets 118 and 119, as best shown in Fig. 14. The mid-portion of the transverse member 126 is connected with the mid-portion of the transverse member 19 of the main frame 1 by the remaining bracket 121 which is preferably constructed of resilient material so as to permit the bracket to flex or twist sufficiently to effect the same result that would be obtained by the use of known types of pivotal connections, such as the supporting member 41, between the said bracket and the transverse member of the main frame. The shafts of the transmission mechanism 8 and the spindle of the power turbine 7 are rotatably mounted in bearings (not shown) provided in the transmission housing and turbine casing as is common practice in the art. The casing of the power turbine 7 and the housing of the transmission 8 are supported on the rectangular frame 122 by means of laterally projecting supporting portions 127 and 128, respectively, as best shown in Figs. 11 and 15. Movement of the transmission housing and turbine casing with respect to the supporting frame is prevented in the usual manner by the use of loose fitting bolts or an equivalent means not shown. This structure provides a three point support for the transmission and power turbine as a unit, and it should be particularly noted that this three point support and the three point support for the continuous combustion turbine system are both symmetrically arranged with respect to the longitudinal axis of the locomotive, that the two laterally spaced points of each three point support are disposed in proximity with respect to, i. e., substantially in, a vertical plane extending transversely of the said axis, and that, consequently, torsional movements of the main frame will not effect relative movements between the coacting elements of the structures mounted on the said two three point supports. Stated differently, the mounting of the two three point supporting structures in the manner just described eliminates a material degree of relative torsional movement between the adjacent ends of the structures on which the transmission means and the combustion turbine system are supported, thereby preventing excessive gear wear and the excessive vibration generally experienced with the supporting arrangements heretofore employed.

The prime mover generator unit 6 for starting the continuous combustion turbine system 4 positioned at the front end of the locomotive includes, as best shown in Figs. 1 and 3, an internal combustion engine 129 operatively connected to a generator 131 and to a starting motor 132 by means of gearing 133 and to the blower end of the turbine system by a suitable clutch mechanism 134. The internal combustion engine and the generator and starting motor are supported on a plurality of transverse frame members 136, as best shown in Fig. 1. The prime mover generator unit 6 for starting the continuous combustion turbine system 4 positioned at the rear end of the locomotive includes an auxiliary gas turbine 137 operatively connected to the generator 138 and to the compressor end of the turbine system by means of gearing 139 and a suitable clutch 141, respectively. The auxiliary gas turbine 137 is supported on a bracket means 142 carried by the transverse member 47 of the supporting frame 44 as seen in Fig. 11 and the generator 138 is supported on a pair of laterally spaced longitudinal beam members 143, as best shown in Figs. 11 and 12. The auxiliary turbine 137 receives motive fluid from the combustion chamber 26 of the continuous combustion turbine system 4 positioned at the forward end of the locomotive by means of the pipe 144 which includes a motor operated valve 146 and the pipe 34. Four train heating units 147 are arranged at the rear end of the locomotive and are supported in part by the beam members 143 and in part by the adjacent side wall framework of the locomotive, as shown in Fig. 12. The units are arranged in pairs with each pair exhausting through a conduit 148 which extends upward through the roof.

Referring to Fig. 3 it is seen that the starting motor 132, which may be of the type operable either as a motor or as a generator, is energized by a circuit including a storage battery 149, wire 151, and a manual switch 152 and that the generators 131 and 138 are connected to a common bus 153 by means of the switch controlled circuits 154 and 156, respectively. The motor operated valves 37 controlling the flow of motive fluid to the power turbines 7 associated with the continuous combustion turbine systems 4 positioned at the front and rear ends of the locomotive are separately energized by the switch controlled circuits 157 and 158, respectively. The motor operated valves 114 and 146 controlling the flow of motive fluid to the auxiliary turbines 108 and 137 are also separately energized by the switch controlled circuits 159 and 161, respectively. The motor driven lubricating and transmission fluid pumps 11 and 57, respectively, the fan motor 116 and the fuel transfer pump 93 are separately energized by the switch controlled circuits 162, 163, 164, 166, 167 and 168 of which the circuits 167 and 168 control the operation of the transmission fluid and lubricating pumps associated with the power plant at the front end of the locomotive and the circuits 162 and 163 control the operation of the lubricating and transmission fluid pumps associated with the power plant at the rear end of the locomotive. The arrangement of the control valves for the auxiliary and power turbines is such that when the energizing circuits for the actuating motors are open, the valves are fully closed and that when the said circuits are energized the valves are fully open. The power developed by each continuous combustion turbine unit and the associated power turbine is varied in the usual manner by regulating the firing rate, i. e., the quantity of fuel delivered to the combustion chamber. Suitable apparatus for simultaneously regulating the firing rate of the various burners is well known in the art and since it is not an essential feature of the present invention, it has been omitted in the interests of simplicity.

The procedure for conditioning the two power plants to propel the locomotive, assuming that both power plants are inoperative, that the prime mover generators are declutched from the adjacent turbine system, and that the circuits connecting the generators, the valves, and the pump and fan motors with the common bus are open, is as follows: The starting motor 132 is energized by closing the switch 152 and as soon as the internal combustion engine 129 has started and reaches its normal operating speed, the switch connecting the generator 131 with the bus 153 is closed to permit the selected energization of the motors driving the various auxiliary devices. The motor driven lubricating pump 57 for the turbine system at the front end of the locomotive is then rendered operative by closing the circuit 168 and after the elapse of sufficient time for the lubricant to reach the bearings, the internal combustion engine 129 is clutched to the turbine system 4 and the latter gradually brought up to a predetermined speed. However, before the turbine, and compressor are rotating at the desired speed, the fuel transfer pump 93 is energized by closing the circuit 166 and as soon as the turbine and compressor reach the desired speed, the burners 28 are rendered operative and the firing rate gradually increased until the system is operating under its own power. The internal combustion engine 129 is then declutched from the turbine system and its operation continued so as to furnish power for operating the auxiliary devices.

The locomotive can now be propelled in the desired direction simply by bringing the associated power turbine 7 up to speed and by filling the proper converter units of the associated transmission. The power turbine 7 is brought up to speed by closing the energizing circuit 157 for the motor operated valve 37 which opens the valve and permits the flow of motive fluid to the turbine and by increasing the firing rate. The filling of the proper converter units is accomplished by closing the energizing current 167 for the pump 11 which delivers the transmission fluid to the converter and coupling units and by manipulating the usual control valves (not shown). The dissipation of the heat imparted to the transmission fluid by slippage of the driving and driven converter elements during the starting period is effected by closing the energizing circuit 159 for the motor actuated valve 114 controlling the flow of motive fluid to the auxiliary turbine 108 to operate the four cooling fans 97, 98, 101 and 102. However, a single combustion turbine unit and the associated power turbine is seldom used to drive the locomotive and the next step in conditioning the locomotive for normal operation, assuming that no attempt has been made to propel the locomotive by a single power plant, as just described, is to start the continuous combustion turbine unit at the rear end of the locomotive.

With the turbine unit at the front end of the locomotive operating as previously described, the unit at the rear end is started by closing the energizing circuit 161 for the motor operated valve 146 which opens the valve and permits the flow of motive fluid to the auxiliary turbine 137 which drives the generator 138. The firing rate of the forward unit is, of course, increased to provide the additional energy required to drive the auxiliary turbine 137 and generator 138. When the turbine and generator are up to speed and the generator voltage is commensurate with that of the bus, the circuit 156 connecting the generator with the bus is closed thus connecting the generators 131 and 138 in parallel to supply power for the motor driven auxiliaries. The circuit connecting the generator 131 with the bus may now be opened and the operation of the internal combustion engine 129 stopped as the generator 138 is capable of furnishing all the power required by the motor driven auxiliaries. Each of the generators 131 and 138 is capable of generating sufficient power to drive the other as a motor for starting the associated turbine unit in the event the prime mover ordinarily used is inoperative. The clutch 141 is manipulated to connect the auxiliary turbine 137 with the continuous combustion turbine system 4 which is then brought up to speed and placed in operation by rendering the burners operative, by increasing the firing rate and by closing the energizing circuit for the associated lubricating pump as described in connection with the starting of the unit at the front end of the locomotive. If the opening of the circuit connecting the generator 131 with the bus and the stopping of the internal combustion engine 129 has not already been done, it is done at this time. Both of the continuous combustion turbine systems are now in condition for driving the locomotive and all that remains to be done in order to propel the locomotive is to bring the associated power turbines 7 up to speed and to fill the proper converter units of the associated transmissions 8.

The power turbines 7 are brought up to speed by closing the energizing circuits 157 and 158 for the motor operated valves 37 which opens the valves and permits the flow of the motive fluid to the turbines and by increasing the firing rate sufficiently to provide the additional energy required for driving the power turbines 7. The selected converter units are filled with transmission fluid by closing the energizing circuits 163 and 167 for the transmission fluid pumps 11 and by manipulating the usual control valves not shown. The firing rate is then further increased to start the locomotive and the load drawn thereby and to propel the locomotive at the desired speed. There is considerable slippage between the driving and driven elements of the converter units during the starting period and when the locomotive is operating at a speed materially less than its normal speed and in order to maintain the transmission efficiency within permissible limits, it is necessary to rapidly dissipate the large amount of heat which is imparted to the transmission fluid during such periods of operation. This result is accomplished by closing the circuits 164 and 159 to energize the motor driven fan 116 and the motor operated valve 114 for the auxiliary turbine 108 during the starting period and when the locomotive is operating at slow speeds whereby all five fans 97, 98, 99, 101 and 102 are operated to force the maximum quantity of cooling air through the heat exchanger 89. When the locomotive is operating at its normal speed there is seldom more than 3% slip between the driving and driven elements of the hydraulic units and after the locomotive attains its normal operating speed, the energizing circuit 159 for motor operated valve 114 is opened which terminates the operation of the auxiliary turbine 108 and the four cooling fans 97, 98, 101 and 102.

The locomotive is brought to a stop by decreasing the firing rate, by applying the usual brakes (not shown) and by emptying the hydraulic coupling units. In making stops of short duration, the preferable procedure is to simultaneously apply the brakes and reduce the firing rate to a value just sufficient to maintain the continuous combustion turbine systems and the associated power turbines operating under their own power when the hydraulic coupling units are emptied and to empty the hydraulic coupling units when the speed of the driven elements decreases sufficiently to again load the turbine units. In order to again start the locomotive, all that is necessary is to refill the converter units and to increase the firing rate as previously described.

Figure 16:
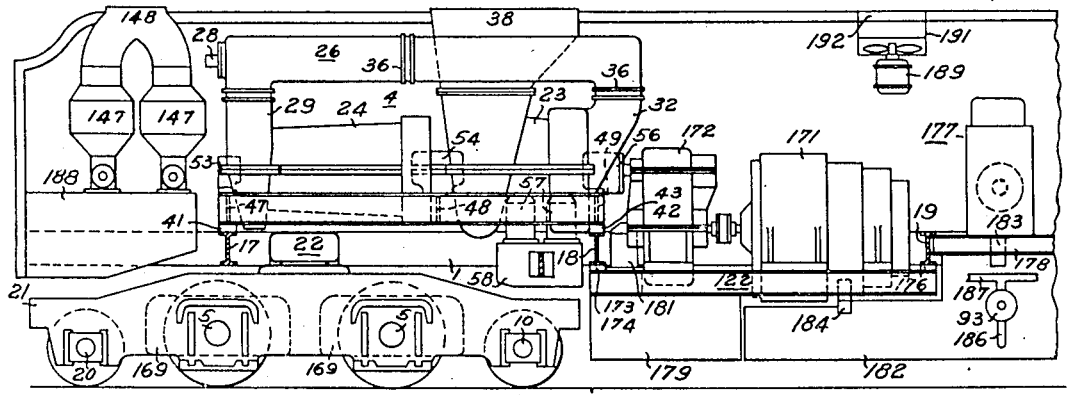
Fig. 16 is an enlarged side elevation of the rear portion of the locomotive shown in Fig. 2.

Figs. 2 and 16 illustrate a modified arrangement in which like numerals are used to designate the same or similar parts. This modification differs from the construction shown in Figs. 1, 11 and 12 in that an electric drive is employed which includes an electric motor 169 geared to each driving axle 5 of the two bogies 2 in a conventional manner and an electric generator 171 driven by each continuous combustion turbine system 4 by means of the reduction gearings 172. The capacity of the turbines 23 have been increased sufficiently to develop the necessary power required for driving the generators 171 which eliminates the use of the separate power turbines 7 of Fig. 1.

The construction of the main frame 1 of the locomotive and the construction by means of which each continuous combustion turbine system 4 is supported on the main frame in symmetrical relation with respect to the longitudinal axis of the locomotive and in superposed relation with respect to the underlying bogie are identical in all material respects to the constructions shown by Figs. 1, 11-14, inclusive, and a further description of these features is deemed unnecessary. The generator 171 and gearing 172 associated with each continuous combustion turbine system 4 are also supported as a unit on the main frame 1 in symmetrical relation with respect to the longitudinal axis of the locomotive by substantially the same construction as that used to support the associated power turbine 7 and transmission 8 shown in Figs. 1, 11 and 12. The only difference being that the generally rectangular frame 122 is supported on the transverse members 18 and 19 of the main frame 1 by three supporting members 173, 174 and 176 which are similar to those used for mounting the turbine system supporting frame 44 on the transverse main frame members 17 and 18. Consequently, it is seen that in this modification the two three point supporting structures for the turbine system 4 and the associated gearing 172 and generator 171 are also symmetrically arranged with respect to the longitudinal axis of the locomotive and that the two laterally spaced points of each three point support are disposed in proximity with respect to a vertical plane extending transversely of said axis, which prevents torsional movements of the main frame from effecting relative movements of the gear connected high and low speed turbine and generator shafts which in turn eliminates much of the difficulty generally experienced with vehicle gearing of this type.

In this modification, the continuous combustion turbine systems 4 are separately started by means of a single internal combustion engine generator unit 177 and the usual connections (not shown) for selectively connecting one of the two generators 171 with the generator of the starting set so as to drive the selected generator as a motor which in turn drives the adjacent turbine system 4 by means of the gearing 172. The starting set is supported on the two transverse members 19, 19' of the main frame 1 and in the space between the generators 171 by suitable supporting beams 178 of which only one is shown. The three bearings 53, 54 and 56 of each turbine system and the bearings of the associated generator 171, which are not shown, are force lubricated by the pumps 57 as described in connection with Fig 1. A gear oil reservoir 179 is supported on each frame 122 directly beneath the gearing 172 and the oil is withdrawn from the reservoir 179 and delivered to the gearing 172 by means of the pump 181. The necessary pipe connections have been omitted in the interest of simplicity. A fuel oil storage tank 182 which extends beneath the adjacent ends of the frames 122 is supported in part by the beams 178 and in part by each of said frames by means of the supporting elements 183 and 184, respectively. The fuel transfer pump 93 which is mounted on the tank 182 withdraws fuel from the tank and delivers the fuel to the burners through the pipes 186 and 187, respectively. The train heaters 147 of which only two are shown are mounted at the rear end of the locomotive and on the top of the heater fuel tank 188. Two motor driven ventilating fans 189 are mounted adjacent the top or roof of the locomotive by means of the brackets or yokes 191 and operate to withdraw air from the interior of the locomotive and deliver it to the outside through the passage 192.

The first step in the procedure of rendering the two power plants operative to propel the locomotive is to start the internal combustion engine generator set 177 and when that has been accomplished to then start the bearing and gearing lubricating pumps 57 and 181, respectively, for the power plant which is to be first placed in operation. The power for operating the lubricating pumps and other auxiliary devices during the starting period is obtained from the generator of the starting set 177 by means of the usual switch controlled circuits (not shown) which may, however, be arranged in a manner similar to that indicated in Fig. 3. The generator 171 of the power plant which is to be started first is then connected with the generator of the starting set as described in the preceding paragraph. The circuit for energizing the fuel transfer pump 93 is then closed and when the turbine unit is rotating at the proper speed, the burners are rendered operative and the firing rate is increased until the unit is operating under its own power. The connection between the generator 171 of the operating power plant and the starting generator can now be opened and the starting generator connected with the generator of the idle power plant which can then be started in the mnaner just described. In connection with the starting of the second power plant, it must be remembered that the bearing and gearing lubricating pumps 57 and 181, respectively, for that power plant should be rendered operative before initiating operation of the plant. When both power plants are operating under their own power, the operation of the starting set is terminated, as the auxiliary devices can then receive power from either or both of the main generators 171.

The locomotive can now be propelled simply by closing the usual circuits (not shown) to connect the driving motors 169 on the axles 5 of each bogie with the generator 171 of the adjacent power plant to effect a rotation of the driving motors and movement of the locomotive in the desired direction. The burners are simultaneously regulated in the usual manner to vary the firing rate in accordance with the load demand throughout the normal operating range. The locomotive is brought to a stop in the usual manner by decreasing the firing rate to the idling value and by simultaneously effecting a desired braking action which may be either dynamic or mechanical or a combination thereof. The necessary electrical circuits and controls for the electric drive which enables the generators to be separately used as starting motors and simultaneously controlled to propel the locomotive in the desired direction are old in the art and have been omitted since they are not essential for a complete understanding of the present invention.

Figs. 4 to 7, inclusive, illustrate another modified arrangement in which like numerals are used to designate the same or similar parts. This modification differs from the construction shown in Figs. 1, 11, 12 and 13 in that the separate power turbines 7 have been eliminated by increasing the capacity of the turbines 23, in that the corresponding supporting brackets 118', 119' and 121' are connected directly to the casing 81' of the transmission 8 thus eliminating the use of the supporting frame 122, and in that the turbine systems at the front and rear ends of the locomotive of which only the front system is shown are each connected to the adjacent hydromechanical transmission by means of a shaft 193 having on one end a gear 194 which is constantly in mesh with the pinion 66 on the turbine shaft 67 and on its other end a gear 196 which is constantly in mesh with a pinion 197 secured to the intermediate portion of a second shaft 198. The second shaft 198 coacts with the remaining elements of the transmission 8 in exactly the same manner as the turbine shaft 67 shown in Figs. 8 to 10, inclusive, and except for the differences just recited, the transmission shown in Fig. 4 is identical to that shown in Figs. 8 to 10, inclusive. The transmissions 8 in this modification are supported on the transverse members 18, 19 and 18', 19' of the main frame 1 in a manner which effects the same results and which is the full equivalent of the frame and bracket arrangement shown in Figs. 1, 11, 12 and 13.

Figure 6:
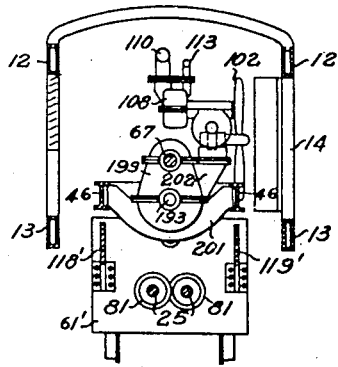
Fig. 6 is a sectional view taken on line VI—VI of Fig. 5.
Figure 7:
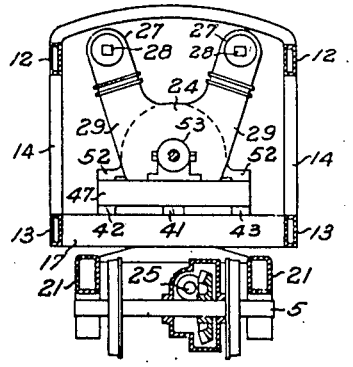
Fig. 7 is a sectional view taken on line VII—VII of Fig. 5.

The pinion end of the turbine shaft and the adjacent end of the shaft 193 are enclosed in a housing 199 which is supported by a bowed transverse member 201 connecting the adjacent end portions of the side members 46 of the supporting frame 44 as shown in Fig. 6. The auxiliary turbine 108 for driving the cooling fans 97, 98, 101 and 102, which is shown as provided with an exhaust conduit 110, is supported on the gear housing 199 by means of a laterally extending portion 202. It should therefore be obvious that each turbine system 4 and the adjacent transmission 8 are supported by the main frame 1 in symmetrical relation with respect to the longitudinal axis of the locomotive by means of two separate three point supporting structures which are arranged and coact in substantially the same manner as the corresponding structures including the frames 44 and 122 of Figs. 1 and 11 to 15, inclusive. Consequently, it is seen that this arrangement also prevents torsional movements of the main frame from effecting relative movements of the gear connected high and low speed shafts, respectively, which in turn eliminates much of the difficulty generally experienced with vehicle gearing of this type. The arrangement and operation of the auxiliary devices including the cooling fans 97, 98, 99, 101 and 102 and the arrangement and operation of the prime mover generator starting sets 6 are also identical to the arrangement and operation of the similar devices described in connection with Figs. 1 and 3. Consequently, a further detailed description of this modification is deemed unnecessary for a complete understanding of the invention.

Figure 22:
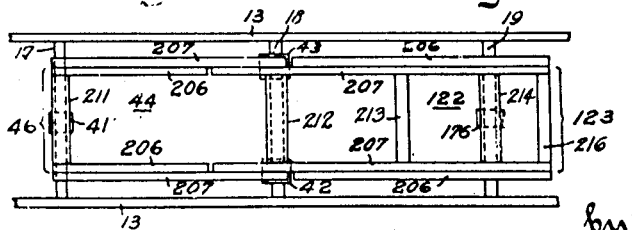
Fig. 22 is a plan diagrammatic view of the supporting frames for the turbine system and for the electric generator and gearing shown in Figs. 17 and 18.
Figure 18:
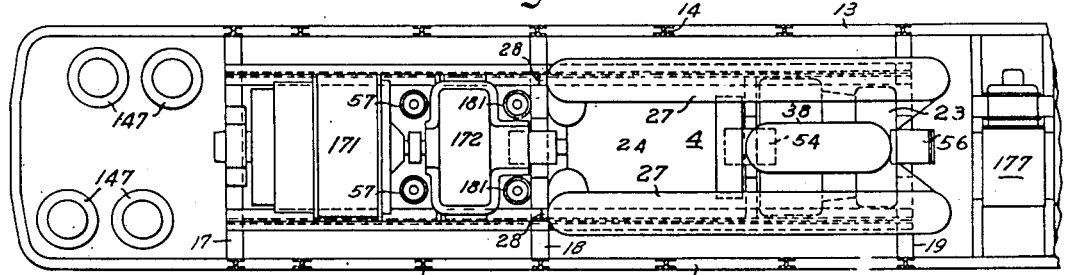
Fig. 18 is a plan view of the portion of the locomotive shown in Fig. 17 with the roof removed.
Figures 19, 20:
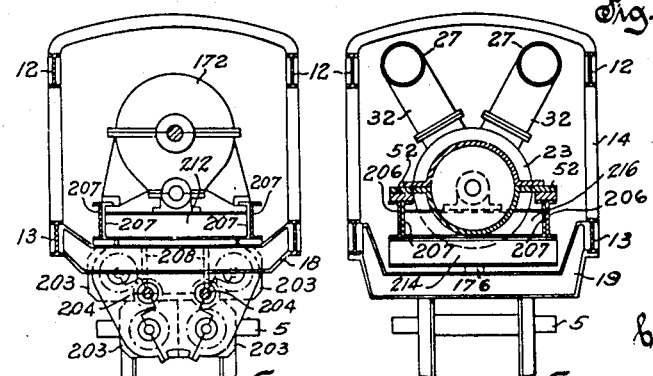
Fig. 19 is a sectional view taken on line XIX—XIX of Fig. 17.
Fig. 20 is a sectional view taken on line XX—XX of Fig. 17.
Figure 21:
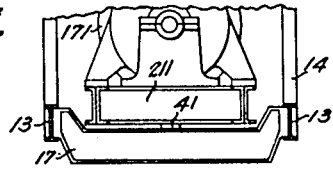
Fig. 21 is a sectional view taken on line XXI—XXI of Fig 17.

Figs. 17 to 22, inclusive, illustrate still another modification in which like numerals are used to designate the same or similar parts. This modification differs from that shown in Figs. 2 and 16 in that the turbine system 4 is positioned in the space formerly occupied by the generator 171 and gearing 172 which are now supported in superposed relation with respect to the adjacent bogie 2, in that the gearing 172 connects the compressor end of each turbine system 4 with the adjacent generator 171, in that each bogie 2 is driven by four motors 203 by means of a pair of drive shafts 204 each of which is geared to each of the two driving axles 5 of the adjacent bogie 2 and to a pair of said motors as best shown in Fig. 19, in that the transverse members 17—19, inclusive, of the main frame 1 are bowed downward as best shown in Figs. 19 to 21, inclusive, in that the side members 46 of the frame 44 and the side members 123 of the frame 122, are each formed by uniting two beam members 206 and 207 of different length so as to provide side members which will permit the adjacent ends of the side members of the frames 44 and 122 to be disposed in telescoped relation and to be supported by the two laterally spaced supporting members 42 and 43 of Fig. 1 as best shown in Fig. 22, in that the gearing 172 is supported on the telescoped beam portions 207 of the frame 122 which supports the turbine system 4, and in that the locomotive is provided with four instead of two train heaters 147 as shown in Fig. 18.

Referring more particularly to Fig. 22, it is seen that the outer ends of the side members 46 of the frame 44 are rigidly connected by a transverse beam 211 which rests on the supporting member 41 which in turn is positioned on the transverse reinforcing member 17 of the main frame 13 and that the side members 123 of the frame 122 are also rigidly connected by means of the longitudinally spaced transverse beams 212, 213, 214 and 216. The transverse beam 214 of the frame 122 rests on the supporting member 176 which in turn is positioned on the transverse reinforcing member 19 of the main frame 13. Thus it is seen that one end of the frame 44 is supported at substantially one point on the support 41, that the other end of the frame 44 is supported at two laterally spaced points by its beam members 207 resting on the supports 42 and 43, that the adjacent end of the frame 122 is also supported at two laterally spaced points by its beam members 207 which also rest on the supports 42 and 43, and that the other end of the frame 122 is supported at one point on the support 176. Consequently it should be obvious that this arrangement also comprises a pair of adjacent three point supporting structures symmetrically arranged with respect to a common axis so that two of the three points of support for one of said structures are disposed in close proximity with respect to a vertical plane which extends transversely of said axis and which intersects two of the three points of support for the other one of the said pair of structures.

Figure 17:
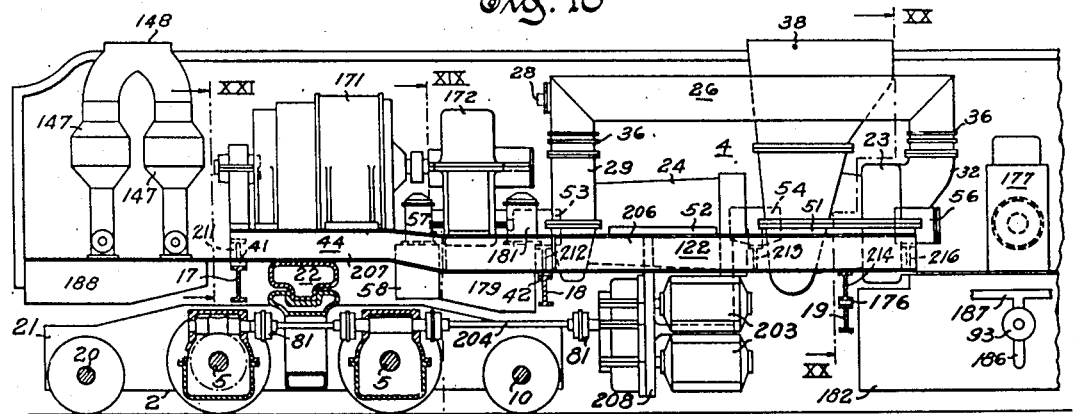
Fig. 17 is a diagrammatic side elevation of the rear portion of a locomotive with the rear side wall and main frame member removed illustrating still another modification.

The frame arrangement shown in Fig. 22 provides a pair of separate three point supporting structures one of which supports the turbine system 4 and gearing 172 and the other one of which supports the generator 171 which is operatively connected with each power plant. The arrangement of the two adjacent three point supporting structures in this modification is the full equivalent of the arrangements shown in Figs. 11 to 16, inclusive. The turbine system 4 and gearing 172 and the associated generator 171 of each power plant are consequently supported on the main frame of the locomotive in symmetrical relation with respect to the longitudinal axis of the locomotive. Therefore, it should be obvious that this construction also operates to prevent torsional movements of the main frame from effecting relative movements of the gear connected high and low speed turbine system and generator shafts which in turn eliminates the difficulty heretofore experienced with vehicle gearing of this type. The four driving motors 203 for each bogie 2 are grouped and supported from the side members 123 of the frame 122 by means of a hollow box construction 208, as shown in Figs. 17 and 19. Each drive shaft 204 is provided with a plurality of the flexible couplings 81.

The control and operation of the two power plants of this modification including the starting procedure is identical to that set forth with respect to the arrangement illustrated by Figs. 2 and 16. Consequently, a further description in this respect is not deemed essential for a complete understanding of the invention.

A combustion chamber formed by two laterally spaced elongated tubular members 27 extending in parallel relation with respect to one another and with respect to the axis of the associated turbine and compressor as previously described provides a compact symmetrical arrangement having a low center of gravity which eliminates much of the difficulty heretofore experienced in mounting combustion turbine systems for vehicle propulsion. Moreover, the construction of the combustion chamber in this manner increases combustion efficiency and materially decreases the height and the overall length of the unit since the difficulty of properly mixing the combustion supporting constituents increases as the diameter of the combustion chamber increases and in order to obtain proper mixing and complete combustion it is necessary to increase and decrease the length of the combustion as the diameter is increased and decreased, respectively. Consequently, a combustion turbine system embodying the above mentioned combustion chamber arrangement can be readily installed in a much smaller space than can a similar system employing the conventional type of combustion chamber.

The previously described correlation of the supporting structures for the turbine systems 4 and the associated means including power transmitting mechanism not only provides a compact arrangement which has a low center of gravity and which prevents torsional movements of the main frame from effecting appreciable relative movements between the coacting elements of the turbine systems and the said associated means, but it also permits each of the power plants to be supported by the portion of the main frame adjacent its point of support on the underlying bogie which in turn permits the use of a lighter and shorter main frame thereby reducing the initial cost, the dead or nonpay load and the overall length of the locomotive. An additional advantage provided by this particular arrangement of the supporting structures and of the power plants which is important in connection with the use of hydraulic transmission is that ample space is provided between the two continuous combustion turbine systems 4 and immediately above the floor plates 91 for a low center of gravity disposition of the heat exchanger 89 and cooling fans 97, 98, 99, 101 and 102.

The arrangement and the controls for the prime mover generator sets for starting the power plants shown in Figs. 1 and 4 and for the turbine systems including the controls for the cooling fans and the controls for the associated power turbines, when such turbines are employed, permits the turbine systems to be separately started, operated and controlled which affords the desired and necessary degree of flexibility and efficient operation under varying conditions of load and speed.

The disclosed correlation of the two three point supporting structures and of the coacting elements of a power plant supported thereon is of general application in that it is immaterial whether the prime mover be an internal combustion engine or any other desired type of prime mover and whether the means including power transmitting mechanism or the power transmitting means be an electric generator, or any other means or combinations of means capable of converting and/or transmitting power from the prime mover to the driving axles of the adjacent bogie. Therefore, although the invention is disclosed in connection with a power plant including a continuous combustion turbine system and either a mechanical transmission or an electric drive, it should be understood that it is not desired to limit the invention to the exact constructions and operations herein shown and described as various modifications within the scope of the appended claims may occur to persons skilled in the art.

It is claimed and desired to secure by Letters Patent:

1. A locomotive comprising a wheel supported main frame, a power plant operable to propel the locomotive and including a continuous combustion power system having a gas turbine, a compressor disposed in axial alinement with respect to said turbine, a pair of elongated combustion chambers disposed alongside of said turbine and compressor and extending in spaced and approximately parallel relation with respect to each other and with respect to the axis of the turbine and compressor, means connecting the compressor ends of said combustion chambers in parallel flow relation with respect to the discharge from said compressor, means connecting the turbine ends of said combustion chambers in parallel flow relation with respect to the inlet to said turbine, and means supporting said power system on said main frame with said combustion chambers symmetrically arranged with respect to a vertical plane including the longitudinal axis of the locomotive.

2. A locomotive comprising a wheel supported main frame, a power plant operable to propel the locomotive and including a continuous combustion power system having a gas turbine provided with an exhaust conduit extending therefrom in an approximate radial direction with respect to the turbine axis, a compressor disposed in axial alinement with respect to said turbine, a pair of elongated combustion chambers disposed alongside of said turbine and compressor on opposite sides of said exhaust conduit and extending in spaced and approximately parallel relation with respect to each other and with respect to the axis of the turbine and compressor, means connecting the compressor ends of said combustion chambers in parallel flow relation with respect to the discharge from said compressor, means connecting the turbine ends of said combustion chambers in parallel flow relation with respect to the inlet to said turbine, and means supporting said turbine system on said main frame with the axis of the turbine and compressor extending longitudinally of the locomotive and with said exhaust conduit superimposed with respect to said turbine.

3. A vehicle comprising a wheel supported frame, a power transmitting means, a continuous combustion power system having a gas turbine, a compressor disposed in axial alinement with respect to said turbine, a pair of elongated combustion chambers disposed alongside of said turbine and compressor and extending in spaced and approximately parallel relation with respect to each other and with respect to the axis of the turbine and compressor, said combustion chambers being symmetrically arranged with respect to the axis of said turbine and compressor and disposed on opposite sides of a vertical plane including said axis, means connecting the compressor ends of the said pair of combustion chambers in parallel flow relation with respect to the discharge from said compressor, means connecting the turbine ends of said pair of combustion chambers in parallel flow relation with respect to the inlet to said turbine, means operatively connecting said power transmitting means with the said continuous combustion turbine system, and means supporting said power system on said frame with said combustion chambers symmetrically arranged with respect to a vertical plane extending longitudinally of the vehicle substantially midway between the sides of said frame.

4. A locomotive comprising a main frame supported on bogies disposed adjacent opposite ends thereof, a power plant supported by each end portion of said main frame in superimposed relation with respect to said main frame and in superposed relation with respect to the underlying bogie, a fluid containing power transmission unit suspended adjacent each of said bogies from an intermediate portion of said main frame, means operatively connecting each of said transmission units with a driving axle on the adjacent bogie, means operatively connecting each of said power plants with the adjacent one of the said power transmission units, and a heat dissipating means connected in circulatory relation with said transmission units and supported in the space between said power plants by intermediate portions of said main frame.

5. A locomotive comprising a main frame supported on bogies disposed adjacent opposite ends thereof, a power plant supported by each end portion of said main frame in superimposed relation with respect to said main frame and in superposed relation with respect to the underlying bogie, a hydromechanical transmission unit and a transmission fluid reservoir suspended adjacent each of said bogies from an intermediate portion of said main frame, means operatively connecting each of said transmission units with a driving wheel on the adjacent bogie, means operatively connecting each of said power plants with the adjacent one of the said transmission units, and an elongated heat exchanger connected in circulatory relation with said transmission units and reservoirs and supported by intermediate portions of said main frame to extend longitudinally of the locomotive in the space between said power plants.

6. A locomotive comprising a main frame supported on bogies disposed adjacent opposite ends thereof, a continuous combustion turbine system supported by each end portion of said main frame in superposed relation with respect to the underlying bogie, a hydromechanical transmission unit and a driving turbine suspended adjacent each of said bogies from an intermediate portion of said main frame, means operatively connecting each of said transmission units with a driving axle on the adjacent bogie, an energy conveying means operatively connecting each of said turbine systems with the adjacent one of the said driving turbines, and an elongated heat exchanger connected in circulatory relation with said transmission units and supported by intermediate portions of said main frame to extend longitudinally along one side of the locomotive in the space between said turbine systems.

7. A locomotive comprising a main frame supported on bogies disposed adjacent opposite ends thereof, a continuous combustion turbine system supported by each end portion of said main frame in superposed relation with respect to the underlying bogie, a hydromechanical transmission unit and a driving turbine suspended adjacent each of said bogies from an intermediate portion of said main frame, means operatively connecting each of said transmission units with a driving axle on the adjacent bogie, an energy conveying means operatively connecting each of said turbine systems with the adjacent one of the said driving turbines, an elongated heat exchanger connected in circulatory relation with said transmission units and supported by intermedate portions of said main frame to extend longitudinally along one side of the locomotive in the space between said turbine systems, and a plurality of devices also disposed in the space between said turbine systems and operable to pass a cooling fluid in heat exchanging relation with respect to said heat exchanger.

8. A locomotive comprising a main frame supported on bogies disposed adjacent opposite ends thereof, a continuous combustion turbine system including a prime mover generator set supported by each end portion of said main frame in superposed relation with respect to the underlying bogie, a power transmitting means suspended adjacent each of said bogies from an intermediate portion of said main frame, means operatively connecting each of said power transmitting means with a driving axle on the adjacent bogie, means operatively connecting each of said turbine systems with the adjacent one of the said power transmitting means, electric motors arranged to drive the auxiliary apparatus essential for the continuous operation of both of said turbine systems and both of said power transmitting means, connections rendering one of said prime mover generator sets operable to start the adjacent one of the said turbine systems and to deliver power for driving said motors, connections operable to deliver driving fluid from the said adjacent one of the turbine systems to the other one of the said prime mover generator sets, and connections rendering the said other one of the prime mover generator sets operable to start the other one of the said turbine systems and to also deliver power for driving said motors.

9. A locomotive comprising a main frame supported on bogies disposed adjacent opposite ends thereof, a continuous combustion turbine system including a prime mover generator set supported by each end portion of said main frame in superposed relation with respect to the underlying bogie, a fluid containing power transmitting means suspended adjacent each of said bogies from an intermediate portion of said main frame, means operatively connecting each of said power transmitting means with a driving axle on the adjacent bogie, means operatively connecting each of said turbine systems with the adjacent one of the said power transmitting means, a heat exchange connected in circulatory relation with said power transmitting means and supported in the space between said turbine systems by intermediate portions of said main frame, a plurality of devices operable to pass a cooling fluid in heat exchanging relation with respect to said heat exchanger, electric motors arranged to drive a number of said devices and the other auxiliary apparatus essential for the continuous operation of both of said turbine systems and both of said power transmitting means, connections rendering one of said prime mover generator sets operable to start the adjacent one of the said turbine systems and to deliver power for driving said motors, connections operable to deliver driving fluid from the said adjacent one of the turbine systems to the other one of the said prime mover generator sets, connections rendering the said other one of the prime mover generator sets operable to start the other one of the said turbine systems and to also deliver power for driving said motors, and a prime mover operatively connected with one of said turbine systems to receive driving fluid therefrom and with the remainder of the said devices for operating the same.

10. In a locomotive combination comprising a power plant including separate turbine systems, a means including a hydromechanical transmission unit operatively connecting each of said turbine systems with a driving axle, a heat exchanger connected in circulatory relation with said transmission units, and a plurality of devices some of which are motor driven operable to pass a cooling fluid in circulatory relation with respect to said heat exchanger, a prime mover generator set including connections operable to start one of said turbine systems and to deliver power to drive said motor driven devices and other motor driven auxiliary apparatus essential for the continuous operation of both turbine systems, a second prime mover generator set operatively connected to receive driving fluid from the said one of the separate turbine systems, connections rendering said second prime mover generator set operable to start the other of the said turbine systems and to also deliver power for driving the said motor driven devices and said other motor driven auxiliary apparatus, and an auxiliary turbine operatively connected with one of said turbine systems to receive driving fluid therefrom and with the remainder of the said devices to operate the same.

11. A locomotive comprising a main frame supported on bogies disposed adjacent opposite ends thereof, a continuous combustion turbine system supported by each end portion of said main frame in superposed relation with respect to the underlying bogie, a means including a fluid containing transmission unit suspended adjacent each of said bogies from an intermediate portion of said main frame, means operatively connecting each of said transmission units with a driving axle on the adjacent bogie, means operatively connecting each of said turbine systems with the adjacent one of the said means including a transmission unit, a heat exchanger connected in circulatory relation with said transmission units and supported in the space between said turbine systems by intermediate portions of said main frame, a plurality of devices also disposed in said space and operable to pass a cooling fluid in heat exchanging relation with respect to said heat exchanger, a means dependent upon the operation of one of the said turbine systems and operatively connected with some of said devices to effect an operation thereof, and means operable independently of either of said turbine systems and connected with the remainder of the said devices for operating the same.

12. In a locomotive combination comprising a plurality of fluid containing transmission units operatively connected with separate driving axles, a power plant operatively connected with each of said transmission units for propelling the locomotive, and a heat exchanger connected in circulatory relation with said transmission units, a plurality of devices operable to pass a cooling fluid in heat exchanging relation with respect to said heat exchanger, a means dependent upon the operation of one of the said power plants and operatively connected with some of said devices to effect an operation thereof, and means operable independently of the said power plants and connected with the remainder of the said devices for operating the same.

13. In a locomotive combination comprising a fluid containing transmission unit operatively connected with a driving axle, a power plant operatively connected with said transmission unit for propelling the locomotive, and a heat exchanger connected in circulatory relation with said transmission unit, a plurality of devices operable to pass a cooling fluid in heat exchanging relation with respect to said heat exchanger, a means dependent upon the operation of said power plant and operatively connected with some of the said devices to effect an operation thereof, and means operable independently of said power plant and connected with the remainder of the said devices for operating the same.

14. In a locomotive combination comprising a power plant including separate continuous combustion turbine systems, a power transmission unit means operatively connecting each of said turbine systems with a driving axle, and motor driven auxiliary devices essential for the continuous operation of both of said turbine systems and both of said power transmission means, a prime mover generator set including connections operable to start one of said turbine systems and to deliver power for operating all of said motor driven devices, a second prime mover generator set operatively connected with the said one of the separate turbine systems to receive driving fluid therefrom, and connections rendering said second prime mover generator set operable to start the other of the said turbine systems and to also deliver power for operating the said motor driven devices.

15. In combination with a vehicle having a prime mover and a mechanically connected power transmitting means rendering said prime mover operative to propel said vehicle, means for operatively supporting said prime mover and said power transmitting means comprising a pair of adjacent supporting structures, a vehicle frame on which said structures are supported at a plurality of spaced points, and said spaced points of support for said pair of structures being in effect six in number and symmetrically arranged with respect to a common axis extending longitudinally of the vehicle with four of the said six points of support disposed substantially in a vertical plane which extends transversely of said axis to thereby eliminate a material degree of relative torsional movement between said pair of supporting structures.

16. In a combination with a vehicle having a prime mover and a mechanically connected power transmitting means rendering said prime mover operative to propel said vehicle, means for operatively supporting said prime mover and said power transmitting means comprising a pair of adjacent supporting structures, a frame on which said structures are supported at a plurality of spaced points, and said spaced points of support for said pair of structures being in effect six in number and symmetrically arranged with respect to a common axis extending longitudinally of the vehicle with four of the said six points of support arranged to be intersected by a vertical plane which extends transversely of said axis.

17. In combination with a vehicle having a prime mover and a mechanically connected power transmitting means rendering said prime mover operative to propel said vehicle, means for operatively supporting said prime mover and said power transmitting means comprising a pair of adjacent supporting structures, a vehicle frame on which said structures are supported at a plurality of spaced points with one of said structures overlying said frame and with the other of said structures disposed below said frame, and said spaced points of support for said pair of structures being in effect six in number and symmetrically arranged with respect to a common axis extending longitudinally of the vehicle with four of the said six points of support disposed substantially in a vertical plane which extends transversely of said axis to thereby eliminate a material degree of relative torsional movement between said pair of supporting structures.

18. In combination with a vehicle having a main frame, a power plant, and a power transmitting means mechanically connected with said power plant for propelling said vehicle, means for supporting said power plant and said power transmitting means so as to prevent torsional movements of said frame from effecting a material degree of relative torsional movement between the connecting portions of said power plant and said power transmitting means comprising a pair of adjacent supporting structures one of which supports said power plant and the other of which supports said power transmitting means, said structures each being supported by said frame at a plurality of spaced points, and said spaced points of support for said pair of structures being in effect six in number and symmetrically arranged with respect to a common axis extending longitudinally of the vehicle with four of the said six points of support disposed substantially in a vertical plane which extends transversely of said axis.

19. In combination with a vehicle having a main frame, a power plant, and a power transmitting means connected with said power plant for propelling said vehicle, means for supporting said power plant and said power transmitting means so as to effect a low center of gravity for the vehicle and so as to prevent torsional movements of said main frame from effecting a material degree of relative torsional movement between the connecting portions of said power plant and said power transmission means comprising a pair of adjacent supporting structures one of which overlies said main frame and the other of which is disposed below said main frame, said structures being supported by said frame at a plurality of spaced points, and said spaced points of support for said pair of structures being in effect six in number and symmetrically arranged with respect to a common axis extending longitudinally of the vehicle with four of the said six points of support disposed substantially in a vertical plane which extends transversely of said axis.

20. A locomotive comprising a bogie supported main frame, means coacting with laterally and longitudinally spaced portions of said main frame and forming therewith a pair of adjacent supporting structures one of which is disposed in superposed relation with respect to a bogie and the other of which is disposed below said main frame and in proximity with respect to an end of said bogie, said structures each being supported by said main frame at a plurality of spaced points, said points of support for said pair of structures being in effect six in number and symmetrically arranged with respect to a common axis extending longitudinally of the locomotive with four of the said six points of support disposed substantially in a vertical plane which extends transversely of said axis, a power plant supported on said one of the said pair of structures, a power transmitting means supported on said other of the said pair of structures, and means operatively connecting said power transmitting means with said power plant and with a driving wheel on said bogie.

21. A locomotive comprising a main frame supported on spaced bogies disposed adjacent the opposite ends thereof, means coacting with laterally and longitudinally spaced portions of said main frame and forming therewith a pair of adjacent three point supported structures one of which overlies one end portion of said main frame and the other of which is disposed below said main frame and in proximity with respect to the inner end of the bogie supporting said one end of the main frame, said pair of structures being symmetrically arranged with respect to a common axis extending longitudinally of the locomotive, a power plant supported on said one of the said pair of structures, a power transmitting means supported on said other of the said pair of structures, and means operatively connecting said power transmitting means with said power plant and with a driving wheel on said bogie.

22. A locomotive comprising a bogie supported main frame, means coacting with laterally and longitudinally spaced portions of said main frame and forming therewith a pair of adjacent three point supported structures one of which is disposed in superposed relation with respect to a bogie and the other of which is disposed below said main frame and in proximity with respect to an end of said bogie, said pair of structures being symmetrically arranged with respect to a common axis extending longitudinally of the locomotive, a power plant supported on said one of the said pair of structures, a power transmitting means supported on said other of the said pair of structures, and means operatively connecting said power transmitting means with said power plant and with a driving wheel on the said bogie.

JAMES L. RAY.

CERTIFICATE OF CORRECTION.

Patent No. 2,298,309. October 13, 1942.

JAMES L. RAY.

It is hereby certified that error appears in the printed specification of the above numbered patent requiring correction as follows: Page 9, first column, line 22, claim 3, for "betwen" read --between--; and second column, line 21, claim 7, for "intermedate" read --intermediate--; line 71, claim 9, for "exchange" read --exchanger--; page 10, second column, line 38, claim 14, strike out "unit"; page 11, first column, line 58, claim 19, before "connected" insert --mechanically--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.